United States Patent [19]

Binder

[11] Patent Number: 5,169,474
[45] Date of Patent: Dec. 8, 1992

[54] APPARATUS AND METHOD FOR DELAMINATING A COMPOSITE LAMINATE STRUCTURE

[75] Inventor: Alan M. Binder, Lexington, Mass.

[73] Assignee: Polaroid Corporation, Cambridge, Mass.

[21] Appl. No.: 799,085

[22] Filed: Nov. 27, 1991

[51] Int. Cl.[5] .............................................. B32B 35/00
[52] U.S. Cl. .................................. 156/344; 156/584; 430/256
[58] Field of Search ............... 430/253, 256, 257, 258, 430/259, 260, 261, 262; 271/280, 281, 285; 156/344, 584; 354/354; 355/311, 315

[56] References Cited

U.S. PATENT DOCUMENTS

| | | | |
|---|---|---|---|
| 3,266,797 | 8/1966 | Stievenart | 271/64 |
| 3,348,839 | 10/1967 | Stievenart et al. | 271/285 |
| 3,441,458 | 4/1969 | Milliken | 156/89 |
| 3,490,842 | 1/1970 | Reick et al. | 355/315 X |
| 3,669,665 | 1/1972 | Faigenbaum et al. | 96/36 |
| 3,936,343 | 2/1976 | Walls | 156/368 |
| 4,157,412 | 6/1979 | Deneau | 428/147 |
| 4,165,251 | 8/1979 | Matsumoto et al. | 156/584 |
| 4,183,751 | 1/1980 | Matsumoto et al. | 430/258 |
| 4,508,589 | 4/1985 | Tarui et al. | 156/584 |
| 4,631,110 | 12/1986 | Tsumura et al. | 156/584 |
| 4,670,085 | 6/1987 | van der Meer et al. | 156/584 |

FOREIGN PATENT DOCUMENTS 62-152707 7/1987 Japan .
8804237 6/1988 PCT Int'l Appl. .

Primary Examiner—David A. Simmons
Assistant Examiner—Mark A. Osele
Attorney, Agent, or Firm—Louis G. Xiarhos

[57] ABSTRACT

A thermally exposed laminate is passed between the nip of a pair of peel and pressure rollers toward a pair of tab and deflector rollers which are movable through an arcuate path, such that, the tab roller initiates separation of the disposable sheet from the retained sheet and pulls the disposable sheet between the driven tab and peel rollers, while the retained sheet is contacted by the deflector roller for bending of the sheet around the pressure roller. The disposable and retained sheets are traversed through divergent paths, respectively to waste and to the next processing stage.

12 Claims, 5 Drawing Sheets

APPARATUS AND METHOD FOR DELAMINATING A COMPOSITE LAMINATE STRUCTURE

BACKGROUND OF THE INVENTION

The present invention relates in general to a delamination apparatus and method, and more particularly to apparatus and a method for separating layers of a laminar film unit containing laminar imaging material.

The prior art contains many devices and methods for separating layers of laminar film units, for instance, for the purpose of rendering a developed image visible. Such apparatus and methods are commonly used in connection with so called peel apart film units and may utilize a blade or other element insertable between two predetermined layers or sheets of a film unit fixed to the periphery of a rotating drum, for instance that disclosed in U.S. Pat. No. 4,670,085.

Such prior art apparatus and methods may be characterized as providing a peeling action, for instance removal of one layer from another. They would not however be suited for providing delamination as understood in the context of the present invention. Delamination in the sense used herein, is to be understood as meaning a process of separating cover or support sheets from opposite surfaces of a vertically frangible layer each carrying different portions of the frangible layer with it as determined by the strength of an adhesive bond at any given point between the surfaces of the layer and the respective sheet. Vertical frangibility of the layer as used herein is intended to mean the ability of the layer to break in a direction normal to its surface but to exclude breaking of the layer between its surfaces.

In U.S. patent application Ser. No. 07/616,796, filed Nov. 21, 1990, there is disclosed a device for accomplishing a delamination as described above wherein apparatus is provided for delaminating a composite sheet structure comprising complementarily adjoined portions of a frangible layer adhesively bonded to a pair of sheets, the structure having a marginal portion attached to one and extending beyond the other of the sheets. The apparatus comprises a first roller means having an axially extending slot in its peripheral surface, second roller means positioned in parallel to the slot, and means for inserting the marginal portion into the slot and further means for rotating the first roller in a direction winding one sheet on the first roller and moving the other sheet away from the first and second rollers.

While the device and method disclosed have proved successful, the present invention has an objective to provide an improved process and method to accomplish the delamination of a composite sheet structure such as that which is described in the aforementioned U.S. patent application.

It is therefore an object of the invention to provide apparatus and method for delaminating a composite sheet structure comprising a plurality of selectively releasable superposed sheets.

A further object of the invention is to provide a novel apparatus for delaminating a composite sheet structure of the aforesaid kind in such a manner that predetermined portions of a frangible layer interposed between, and releasably connected to two sheets, are provided on one of the sheets with complementarily adjoining portions of the layer provided on the other sheet.

Yet another object of the invention is to provide apparatus and method for separating two sheets enclosing between them a layer of an image forming substance, to remove predetermined portions from the layer thereby to form two complementary images.

And yet a further object of the invention is to provide a novel delamination apparatus and method which makes possible a selective removal of portions of a frangible layer by sheets adhered to opposite surfaces of the layer.

SUMMARY OF THE INVENTION

The above objects and other objectives which will become apparent as the description proceeds are accomplished by providing apparatus for delaminating a composite sheet structure of the kind comprising a vertically frangible layer having a first surface adhesively bonded to a first sheet at a substantially uniform strength and an opposite surface abutting areas of which are, respectively, adhesively bonded to a second sheet at strengths less or greater than the uniform strength and having a marginal portion formed by a scored line along the first sheet, the portion extending beyond the first sheet. The apparatus comprises a first pair of upper and lower rollers disposed to provide a nip for feeding the composite sheet along a path therebetween. Means is provided for rotating the upper roller and lower roller in opposite directions. A second pair of upper and lower rollers having their axes in juxtaposition are movable as a unit through an arcuate path crossing the composite sheet path, and means is provided for rotating the upper roller and lower roller of the second roller pair in opposite directions. Means is provided for moving the second pair of upper and lower rollers to a first position along the arcuate path wherein the forward edge of the composite sheet moving along the composite sheet path contacts the upper roller of the second roller pair to bend the marginal portion of the sheet upwardly in a direction away from the lower roller of the second roller pair to separate the margin portions at the scored line and move the second sheet upwardly, and for moving the upper and lower rollers of the second roller pair to a second position along the arcuate path where the upper roller contacts the upper roller of the first roller pair with the second sheet therebetween for feeding the second sheet upwardly. The first sheet contacts the lower roller of the second roller pair rotating in a direction to feed the first sheet downwardly.

The second pair of rollers may be mounted on a shaft for arcuate, e.g., radial, movement about the shaft.

A method is also provided for delaminating a composite laminar structure comprising a frangible layer having a first surface adhesively bonded to a first sheet at a substantially uniform strength and abutting areas of an opposite surface attached to a second sheet at strengths less and greater than the uniform strength and having a marginal portion formed by a score line along the first sheet and extending beyond the first sheet. The method comprises the steps of feeding the laminar structure through a first pair of upper and lower opposite rotating rollers along a path.

A second pair of upper and lower opposite rotating rollers is provided along the path of the structure and positioned such that the upper of the second pair of rollers intercepts the leading edge of the structure and moves it upwardly, bending the structure about the score line and causing the structure to separate at the score line. The second pair of rollers is then moved to a position wherein one of the rollers is pressed against the upper of the first pair of rollers with the marginal portion and the second sheet therebetween and the lower of the second pair of rollers contacts the first sheet to move it downwardly from the path of the laminate structure.

The upper of the second pair of rollers is rotated at about the same linear surface speed as, and preferably at a higher linear surface speed than, that of the upper roller of the first pair of rollers.

BRIEF DESCRIPTION OF THE DRAWING

The foregoing and other features of the invention will be more particularly described in connection with the preferred embodiment, and with reference to the accompanying drawing wherein.

DESCRIPTION OF THE PREFERRED EMBODIMENT

Figure 1:
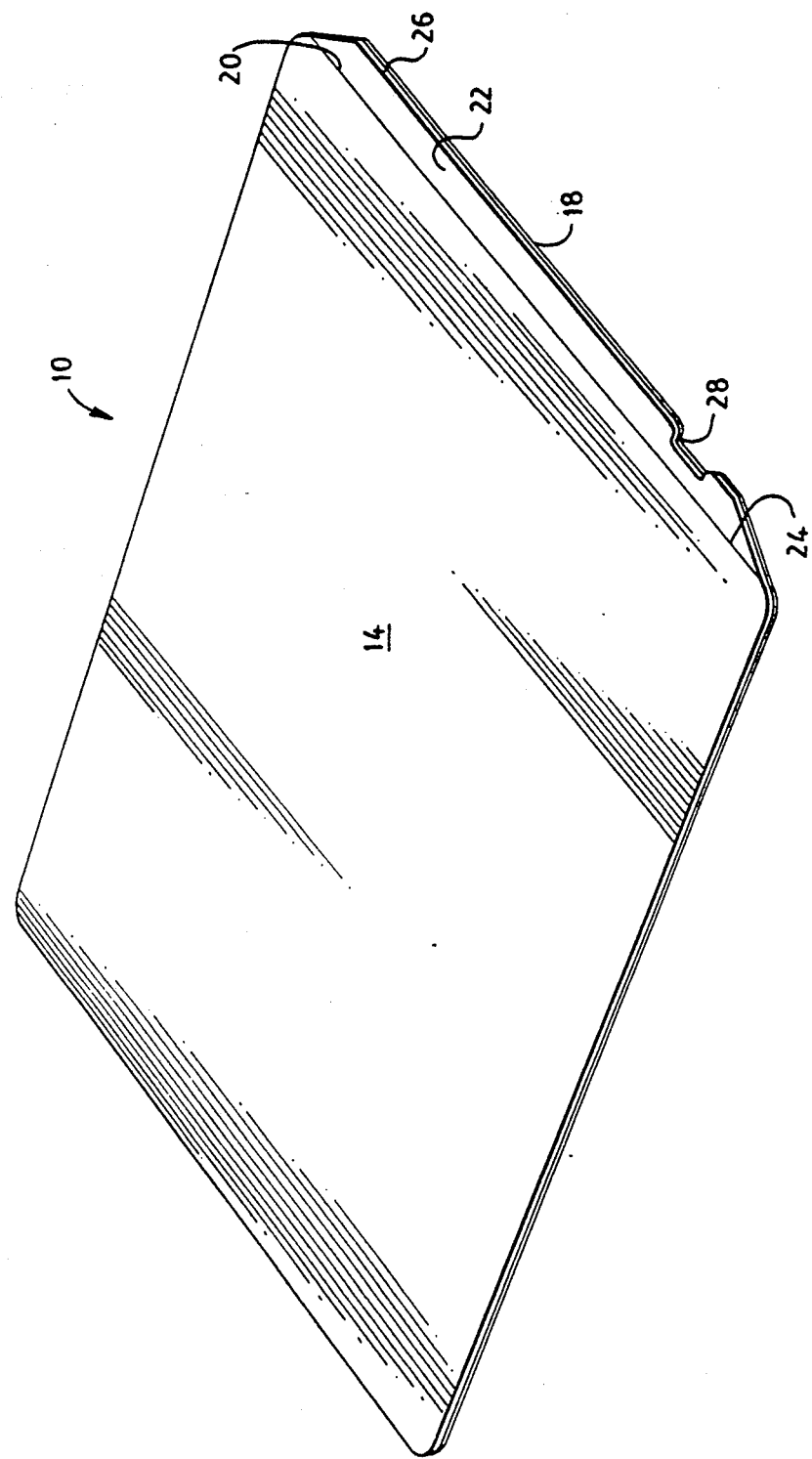
FIG. 1 is a perspective view of a preferred embodiment of the laminate in accordance with the present invention.
Figure 2:
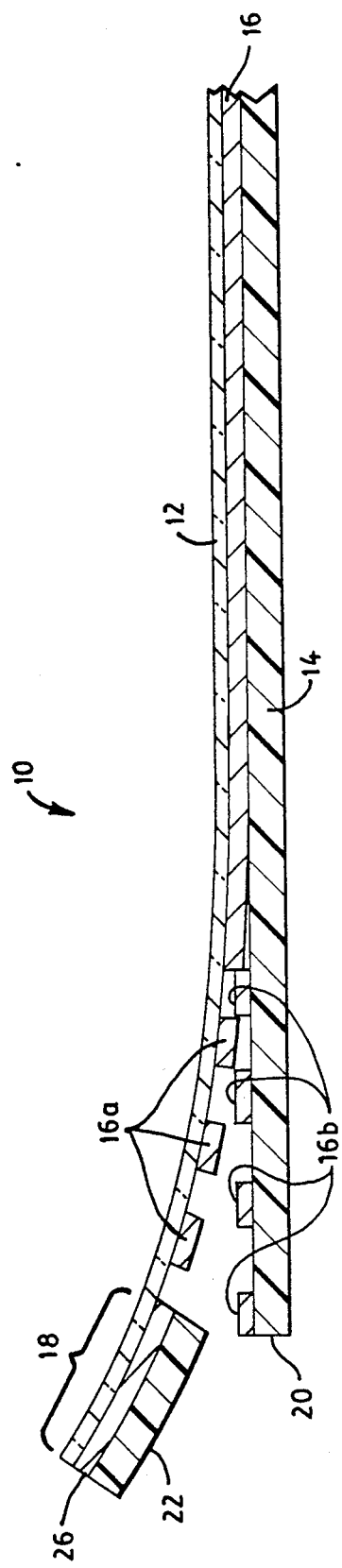
FIG. 2 is a longitudinal sectional view of the laminate of FIG. 1 showing certain aspects of its delamination characteristics, the thickness of its several sheets being exaggerated for purposes of clarity.

Referring now to the drawing, and particularly to FIGS. 1 and 2, a laminate 10 is shown in its preferred embodiment as a thermal imaging film unit of the general kind disclosed by International Application PCT/US 87/03249 published Jun. 16, 1988 under International Publication No. WO 88/04237. The film unit comprises support sheets 12 and 14, each adhesively connected to opposite surfaces of a frangible layer 16. For purposes of the present invention, it is sufficient to note that layer 16 is such that it may be ruptured in a direction normal to its two surfaces along lines defined by exposure, such as is described in the International Application, supra. Portions of layer 16 subjected to exposure can then be separated from portions not affected by exposure to provide complementary images on the respective sheets of the composite sheet structure.

Depending upon the informational content of each of the complementary images and the desired application of such images, either of the images may be considered a principal image. It will be understood that the composite sheet structure can be subjected to a laser scanning or other exposure, such that, a predetermined image ("positive" or "negative") can be provided on either of the sheets thereof.

In the preferred embodiment depicted in FIGS. 1 and 2, the image carried by sheet 14 may be considered the principal image and, accordingly, sheet 14 is termed the "keeper" sheet, for convenience and ease of understanding. Sheet 12 is referred to as a strip sheet or as a "throw-away" sheet, recognizing that either image may be a principal image or an image of secondary importance depending upon the particular use therefore. Keeper sheet 14 is referred to hereinafter as the "first" sheet; and throw-away sheet 12 is referred to as the "second" sheet.

In a preferred laminar structure 10 of FIGS. 1 and 2, frangible layer 16 is a layer of image forming substance coated onto sheet 12 and adhered initially so as to prevent accidental dislocation. Preferably, layer 16 will comprise a pigment material such as carbon black and a binder therefore and comprises a composite of several layers conducive to forming an image of desirably high resolution and optical density as a result of thermal exposure and subsequent processing, including delamination as provided by the instant invention. Lamination of sheet 14 on the coated sheet 12 provides a laminar composite sheet structure 10.

In the preferred laminar composite sheet structure of FIGS. 1 and 2, the adhesive bond between first sheet 14 and frangible layer 16 is, in its initial unexposed state, greater than the bond strength between second sheet 12 and frangible layer 16. As a result of exposure, the bond between exposed portions of frangible layer 16 and sheet 12 becomes stronger than the bond existing ab initio between sheet 14 and the portions of layer 16 not exposed to heat. Abutting portions of layer 16 are, thus, caused by thermal exposure to be adherent to sheet 12 at bond strengths less than and greater than the uniform bond strength between layer 16 and sheet 14. As a result of laser exposure of the depicted and preferred embodiment, portions 16a of layer 16 become more firmly bonded to sheet 12. Portions 16a of layer 16, and portions 16b which have not been affected by heat, may then be separated from each other when the sheets 12 and 14 are delaminated in the manner of this invention.

The exposure can be carried out by a laser scanning technique or other exposing technique suited to the provision of complementarily abutting portions of frangible material separable to the respective sheets of the laminar composite sheet structure. In the preferred embodiment depicted, the exposure will take place through throw-away sheet 12 which is thinner than keeper sheet 14. The particular imaging technique employed will depend upon the particular nature of the laminar composite sheet structure, and especially, on the nature of the image forming substance and the imaging mechanism involved.

In general, it will be understood by those skilled in the art that the apparatus and method of the present invention will be useful for the separation of the sheets of any of a variety of laminar composite sheet structures wherein the preferential adhesion of an image forming substance to one of a pair of sheets is reversed, by thermal or other exposure, to provide complementarily abutting portions of frangible image forming substance separable to the respective sheets. Depending upon the image forming substance and the image forming mechanism, the reversal of such preferential adhesion can be accomplished by either strengthening or weakening the adhesive bonding between the frangible image forming substance and the respective sheets of the composite sheet structure.

The sheets 12 and 14 may be made of the same or of different material, polyethylene terephthalate, polystyrene, polyethylene, copolymers of styrene and acrylonitrile, polyvinyl chloride, polycarbonate and vinylidene chloride being some but not all of the material suited as support sheets. They may themselves be laminar structures provided with a backing of paper (not shown) or any other material suited for any specific purpose. It will be understood that the backing material should be transmissive of exposing radiation or be either removable to permit exposure, or positioned on a sheet opposed from that through which exposure is accomplished. While it is not a requirement, it has been found to be advantageous to have one of the sheets stiffer, i.e., less flexible than the other. The difference in stiffness may be provided by a difference in the materials of which the sheets 12 and 14 are made. Preferably, however, and as shown, a difference in stiffness is attained by one of the sheets 12 being thinner than the other sheet 14.

For purposes to be described, the sheet 12 is provided with a marginal portion or tab 18 extending beyond an adjacent margin 20 of the sheet 14. As a matter of efficient manufacture and as shown, the marginal portion or tab 18 may, but need not, be provided by a similar portion 22 of the sheet 14 severed from it by a score or cut line 24 along its margin 20.

In a common free edge 26 of the marginal portions 18 and 22 and the intermediate layer 16 there is provided a notch 28 which may conveniently serve as an alignment means for correctly placing the laminar film unit 10, or a plurality thereof, in a cassette (not shown) provided with a complementary protrusion in an orientation to ensure that the sheet 12 is facing upwardly for proper placement within the apparatus of this invention.

The length of the laminate film unit 10 measured between the score line 24 and a rear edge may typically be about 25.5 cm (10 in.), its width may be about 20 cm (8 in.), and the dimension of the marginal portion 18 between its forward edge 26 and the score line 24 may be about 6.5 mm (0.25 in.). The thicknesses of the sheets 12 and 14 measure, respectively, about 0.013 to 0.178 mm (0.5 to 7 mil) and 0.038 to 0.254 mm (1.5 to 10 mil), good results having been obtained with sheets of thicknesses of 0.044 and 0.178 mm (1.75 and 7 mil), respectively. Other dimensions may, of course, be substituted. Preferably, the corners of the sheets 12 and 14 are rounded.

Referring now to FIGS. 3 through 7 there is shown an apparatus 30 for separation or delamination of the laminate 10 shown in FIGS. 1 and 2. The laminate 10 is fed from a prior imaging operation by a rotatable drum (not shown) which is rotating in the counter-clockwise direction to feed the laminate into the structure 30. The apparatus 30 generally comprises an upper, or peel roller 32 and a lower, or pressure roller 34 which are supported at their ends on a frame (not shown) and may be driven by any drive means well known in the art, in opposite directions as shown by the arrows in FIG. 3. The rollers 32 and 34 form a nip therebetween into which a laminate 10 is fed, the rollers 32 and 34 being mounted on a frame (not shown) which may be the same frame supporting the rollers 36 and 38 and also may comprise a portion of a larger structure from which the laminate 10 is fed.

A second pair of rollers in the form of an upper tab roller 36 and lower deflector roller 38 are mounted for rotation on a pair of parallel arms 40 and 41, the rollers 36 and 38 being driven in opposite directions of rotation by a suitable gear train which will be discussed below. The parallel arms 40 and 41 are interconnected by a laterally extending support member 42 to form a rigid arm assembly, the assembly being pivotally supported on a shaft 44 which in turn may be assembled to the frame common to the rollers 32 and 34.

Referring now to FIGS. 4 through 7 the laminate 10 is shown to be fed from a prior operation into the nip between the rollers 32 and 34 along a path P with the marginal portion or tab 18 extending forwardly into the nip between the rollers. The tab roller 36 and deflector roller 38 are rotating in opposite directions as shown in FIGS. 3 through 7, and as the laminate 10 enters the rollers 32 and 34 the arms 40 and 41 are moved upwardly along an arcuate path from the position shown in FIG. 4 to that of FIG. 5.

Figure 5:
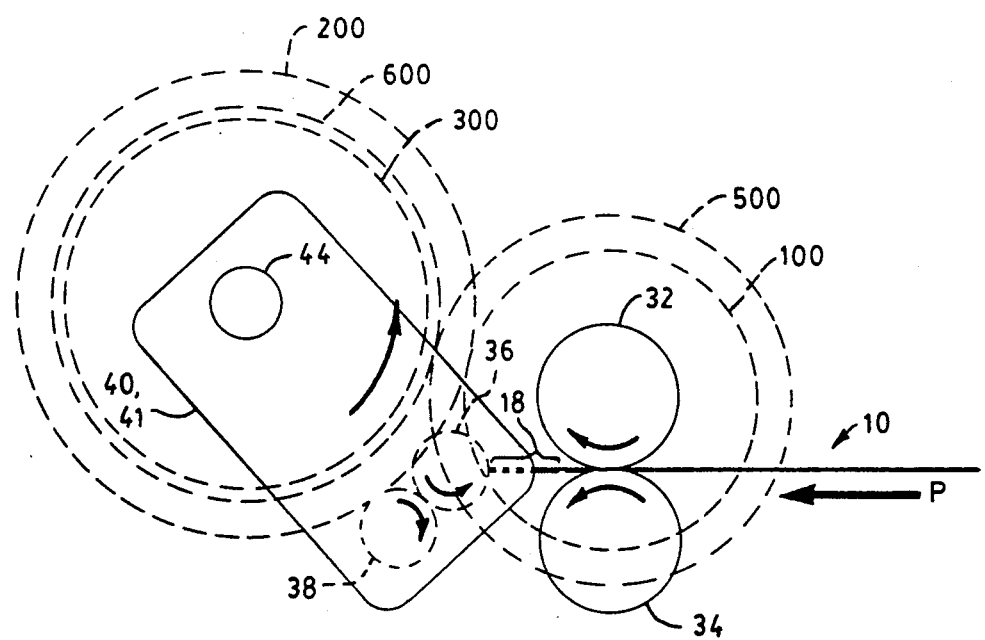
FIG. 5 is a right side schematic view similar to FIG. 4 showing a further step in the operative process.

The laminate 10 is substantially stiff such that the tab 18 continues along the path P, and as shown in FIG. 5, the leading edge of the laminate 10 contacts the tab roller 36 having its surface rotating in the upward direction causing the tab 18 to bend at the scored line 24 substantially severing the uppermost support sheet 12 from the support sheet 14.

Figure 3:
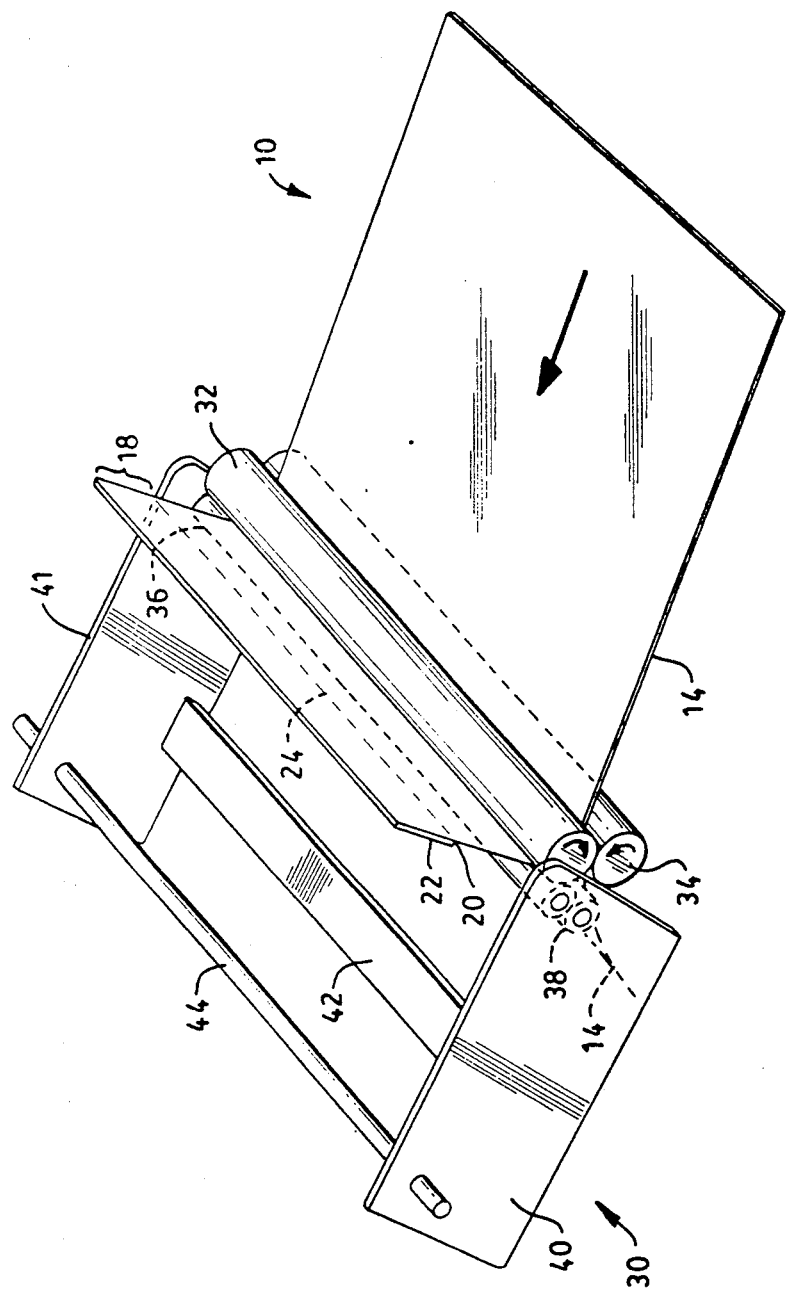
FIG. 3 is a right top perspective view showing apparatus for separation of the laminate of FIGS. 1 and 2 constructed in accordance with the teachings of the present invention.
Figure 4:
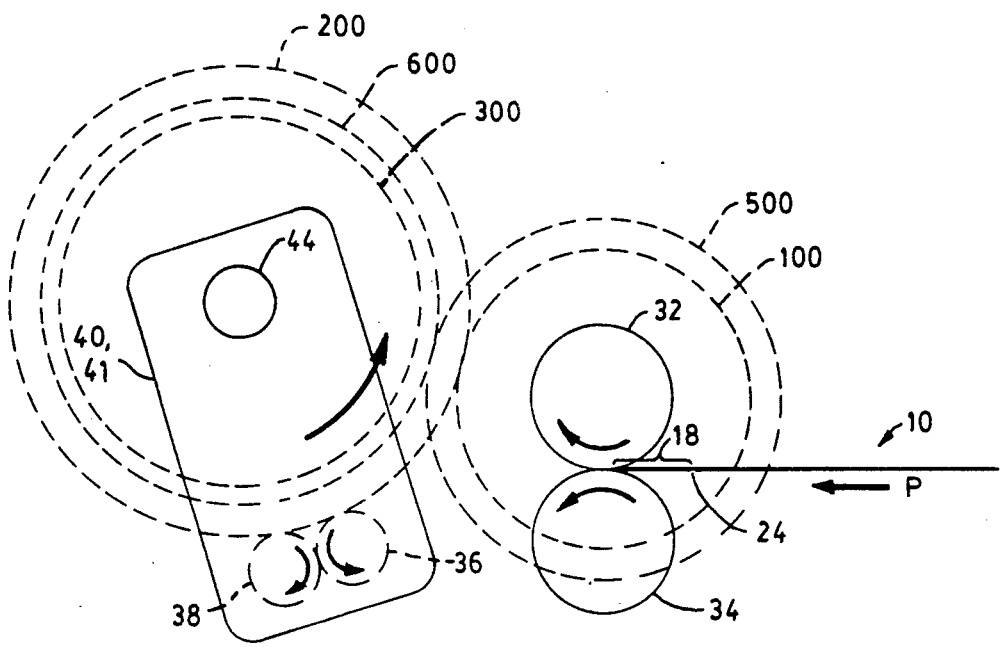
FIG. 4 is a right side schematic view showing the structure of FIG. 3 at the initial step of the operative process.
Figure 6:
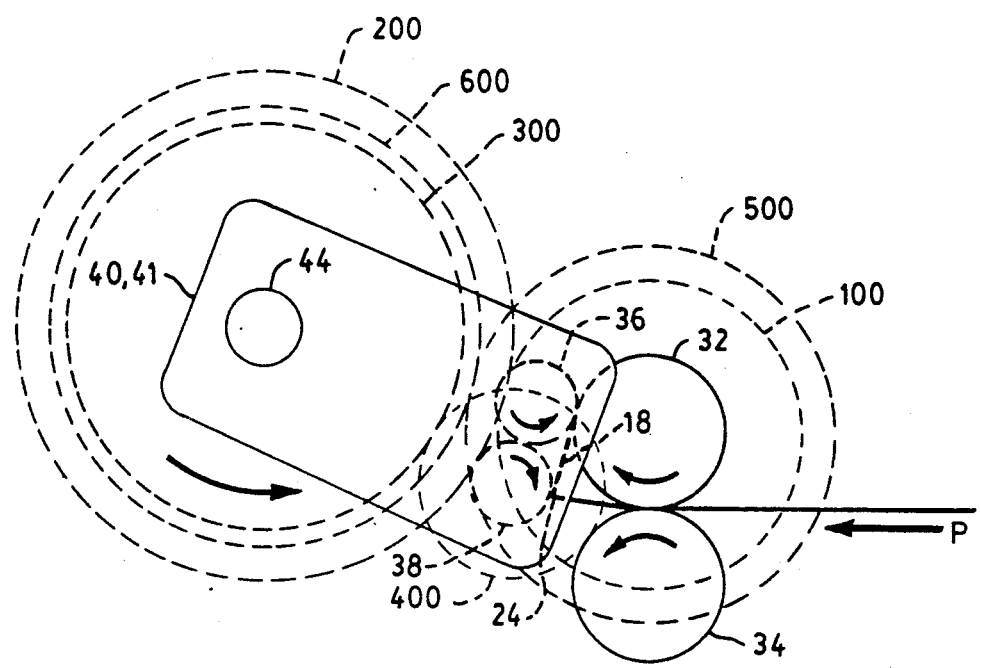
FIG. 6 is a right side schematic view similar to FIGS. 4 and 5 showing yet a further step in the operative process.
Figure 7:
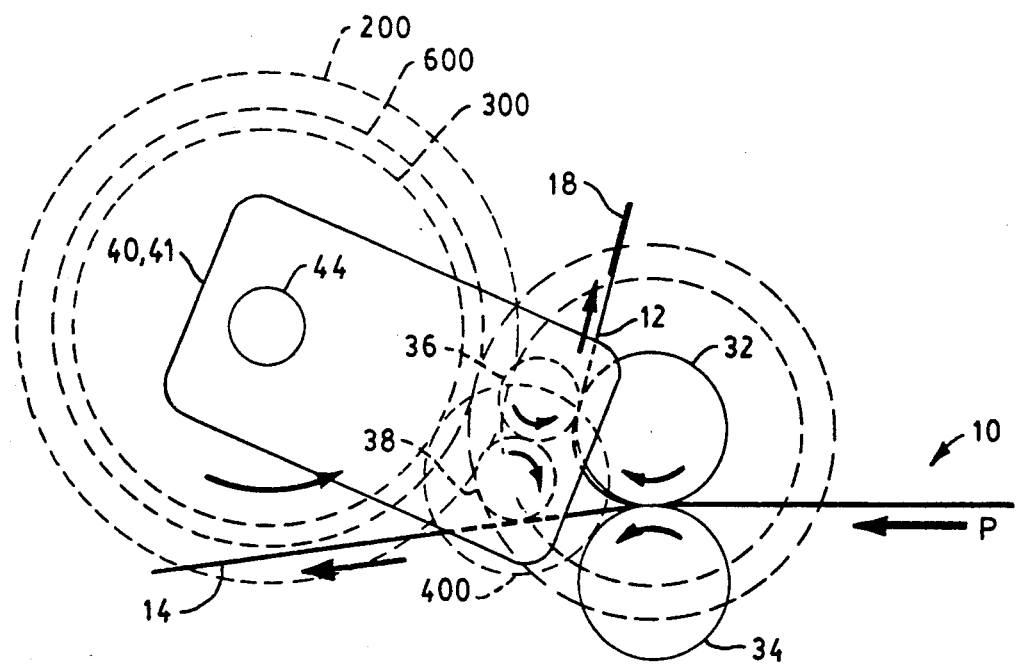
FIG. 7 is a right side schematic view showing the structure of FIGS. 4 through 6 after separation of the laminate.

Referring now to FIG. 6, the arms 40 and 41 continue to move the rollers 36 and 38 along the arcuate path to the point as shown in FIG. 6 wherein the tab 18 is clamped between the upper or peel roller 32 and the upper tab roller 36. The marginal portion 20 of the support sheet 14 also contacts the deflector roller 38 which has a surface moving downwardly and effects a peeling action between the sheets 12 and 14, as is best shown in FIGS. 3 and 7. The support sheet 14 which is the "keeper" sheet is deflected at the proper angle to provide good peeling and is directed to a bin or receptacle for further processing while the support sheet 12 or "throw away sheet" is moved, after leaving the rollers 36 and 32, to a waste receptacle or storage area for discard or retention, as desired.

While the rollers 32, 34, 36 and 38, and the arms 40 and 41 may be driven by any suitable gear train, the power may be applied to the peel roller 32 and be transmitted through a gear 100 to gear 200 on the pivot shaft 44 as best shown in FIG. 6. The power is then transmitted by rotation of gear 200 to gear 300 attached to the gear 200 to gear 400 on the deflector roller. The tab roller 36 may be driven by friction or through gears not shown by the deflector roller 38. Power to rotate the arms 40 and 41 is supplied by gear 500 on the peeler roller 32 through a slip clutch to gear 600 on the pivot shaft 44. It will be appreciated that there are mechanical stops (not shown) to locate the arm assembly both in its initial position and its final running position.

Through the aforementioned gearing, the tab roller 36 is driven at a linear surface speed which is about the same as, or preferably higher than that of the peel roller 32 so as to provide a force that pulls the strip sheet 12 into contact with the peel roller. Materials and surface finishes of the various rollers are selected to provide an appropriate driving force on the laminate 10, and the support sheets 12 and 14, to achieve the desired results.

The present invention provides an improved delamination apparatus and method in that the support sheets 12 and 14 are readily separated from one another and the strip sheet 12 is fed directly, or by means of a transport mechanism, into a set of rollers that form the input to the strip sheet disposal mechanism. Further, the image sheet or keeper sheet 14 is fed directly, or by means of a transport mechanism, from the processing stage into the rollers 32 and 34 to initiate the delaminating process.

While it is apparent that changes and modifications can be made within the spirit and scope of the present invention, it is my intention, however, only to be limited by the appended claims.

As my invention I claim:

1. Apparatus for delaminating a composite sheet structure comprising a vertically frangible layer having a first surface adhesively bonded to a first sheet at a substantially uniform strength and an opposite surface abutting areas of which are, respectively, adhesively bonded to a second sheet at strengths less and greater than the uniform strength and having a marginal portion formed by a score line along said first sheet said portion extending beyond the first sheet, the apparatus comprising:

a first pair of rollers comprising an upper roller and lower roller disposed to provide a nip for feeding said composite sheet therebetween along a composite sheet path;

means for rotating said upper roller and said lower roller in opposite directions;

a second pair of rollers comprising an upper roller and lower roller having their axes in juxtaposition, said second pair of upper and lower rollers being movable as a unit through an arcuate path crossing said composite sheet path;

means for rotating said second pair of rollers in opposite directions;

means for moving said second pair of upper and lower rollers to a first position along said arcuate path wherein a forward edge of a composite sheet moving along said composite sheet path contacts said upper roller of said second pair of rollers to bend the marginal portion of the sheet upwardly in a direction away from said lower roller of said second pair of rollers to separate said marginal portion at said score line and move said second sheet upwardly, and for moving said second pair of rollers to a second position along said arcuate path wherein said upper roller of said second pair of rollers contacts said upper roller of said first pair of rollers with said second sheet therebetween for feeding said second sheet upwardly, and said first sheet contacts said lower roller of said second pair of rollers rotating to feed said first sheet downwardly.

2. The apparatus of claim 1 wherein said second pair of rollers is mounted between a pair of arms, said arms each being mounted on a shaft for arcuate movement about said shaft.

3. The apparatus of claim 1 wherein said upper roller of said second pair of rollers is driven by said lower roller of said second pair of rollers.

4. The apparatus of claim 1 wherein said upper roller of said second pair of rollers is rotated at a higher linear surface speed than the linear surface speed of said upper roller of said first pair of rollers.

5. The apparatus of claim 2 wherein said upper roller of said second pair of rollers is driven by said lower roller of said second pair of rollers.

6. The apparatus of claim 5 wherein said upper roller of said second pair of rollers is rotated at a higher linear surface speed than the linear surface speed of said upper roller of said first pair of rollers.

7. A method of delaminating a composite laminar structure comprising a frangible layer having a first surface adhesively bonded to a first sheet at a substantially uniform strength and abutting areas of an opposite surface attached to a second sheet at strengths less and greater than the uniform strength, and having a marginal portion formed by a score line along said first sheet, said portion extending beyond the first sheet, comprising the steps of:

feeding the structure through a first pair of upper and lower opposite rotating rollers along a path;

providing a second pair of upper and lower opposite rotating rollers along the path of said structure, positioned such that the upper of said second pair of rollers intercepts the leading edge of the structure and moves it upwardly, bending the structure about said score line and causing the structure to separate at said score line; and moving said second pair of rollers to a position wherein the upper one of said second pair of rollers is pressed against the upper one of said first pair of rollers with the marginal portion and the second sheet therebetween and said lower one of said second pair of rollers contacts the first sheet to move it downwardly from the path of said structure.

8. The method of claim 7 wherein said second pair of rollers is mounted as a unit for movement about a pivot axis along an arcuate path between said positions.

9. The method of claim 7 wherein said second pair of rollers is operatively interconnected and said upper roller is driven by said lower roller.

10. The method of claim 7 wherein said upper roller of said second pair or rollers is rotated at a higher linear surface speed than the linear surface speed of said upper roller of said first pair of rollers.

11. The method of claim 8 wherein said upper roller of said second pair of rollers is rotated at a higher linear surface speed than the linear surface speed of said upper roller of said first pair of rollers.

12. The method of claim 11 wherein said second pair of rollers are operatively interconnected and said upper roller is driven by said lower roller.

* * * * *